Oct. 1, 1935.                    R. L. BROWN                    2,015,784
                              BEARING MOUNTING
                              Filed May 4, 1933

INVENTOR:
RAYMOND L. BROWN,
BY
HIS ATTORNEY.

Patented Oct. 1, 1935

2,015,784

UNITED STATES PATENT OFFICE 2,015,784

BEARING MOUNTING

Raymond L. Brown, Harwinton, Conn., assignor, by mesne assignments, to General Motors Corporation, Detroit, Mich., a corporation of Delaware Application May 4, 1933, Serial No. 669,419

11 Claims. (Cl. 308—184)

This invention relates to bearing mountings and comprises all of the features of novelty herein disclosed. An object of the invention is to provide an improved bearing mounting especially adapted for high speed spindles. Another object is to provide a cushioned bearing mounting for relatively rotatable members such that vibration and shock loads will be damped and the bearings will have an initial thrust load.

Figure 1:
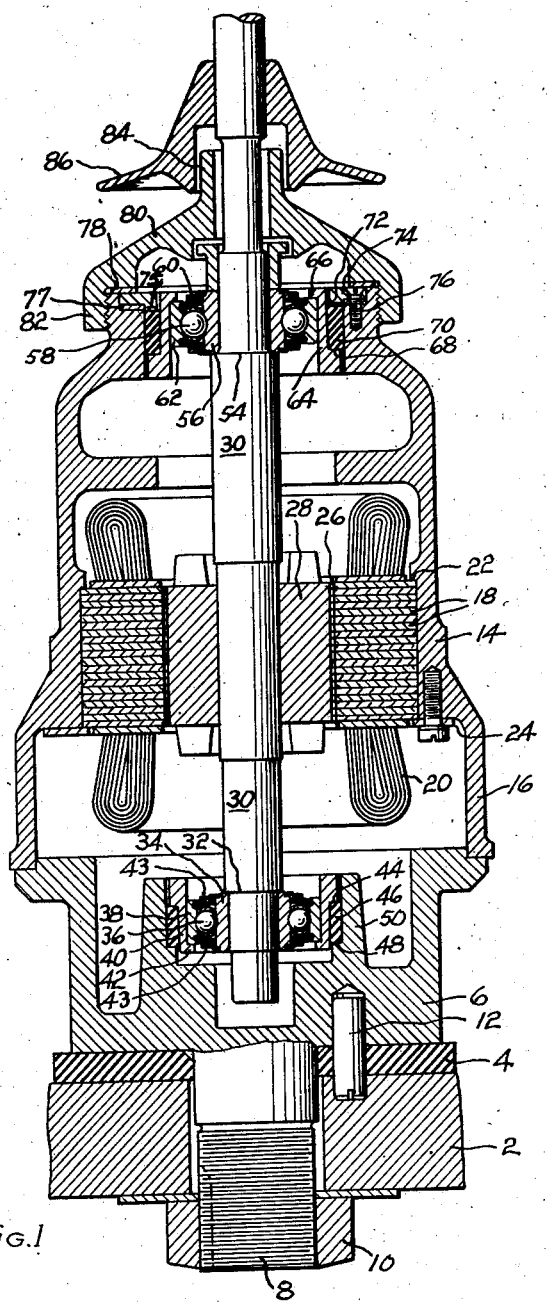

To these ends and also to improve generally upon devices of this character, the invention consists in the various matters hereinafter described and claimed. In its broader aspects, the invention is not necessarily limited to the specific constructions selected for illustrative purposes in the accompanying drawing in which Fig. 1 is a central sectional view of the mounting.

Figure 2:
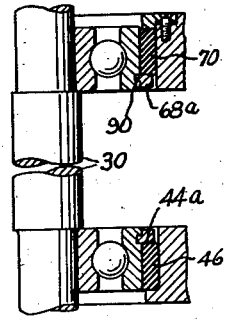

Fig. 2 is a sectional view indicating a modification.

The numeral 2 indicates a spindle frame or rail which supports a yielding pad or cushion 4 which is conveniently made of one or more rubber discs to damp or absorb vibration of a bolster case 6. The bolster case has the usual threaded shank 8 and a nut 10 for securing the case to the rail, a pin 12 locking the case positively from rotation. A motor casing 14 has a skirt or flange 16 suitably secured to the bolster case 6. Laminations 18 having field windings 20 fit inside the motor casing and are clamped between a shoulder 22 and a ring 24 which is secured to the casing by screws. The laminations have a clearance at 26 with an armature 28 which is secured to a blade or spindle 30 supported for high-speed rotation on a vertical axis. The upper end of the spindle is adapted to carry a bucket (not shown) which contains a varying amount of rayon yarn or the like.

The lower portion of the spindle has a shoulder or abutment 32 against which rests an inner race ring 34 of an antifriction bearing having rolling elements in the form of balls 36. The inner race ring preferably has a press fit on the spindle and an outer race ring 38 is similarly press-fitted in a sleeve or bearing housing 40 against a flange or abutment 42 thereof. The bearing has suitable seals 43 at both sides to retain grease. Externally the housing 40 is provided with an abutment or shoulder 44 and, below the shoulder, the housing is slightly tapered to facilitate the application of a pad or yielding cushion 46. The cushion is preferably made of comparatively soft rubber in the form of a ring or sleeve supported at its lower end against an abutment or shoulder 48 formed on an annular projection 50 which fits the periphery of the cushion.

Near the upper portion of the motor casing 14, the spindle has an abutment or shoulder 54 supporting an inner race ring 56 of an antifriction bearing 58. Suitable grease seals 60 are carried by an outer race ring 62 of the bearing which fits in a bearing housing 64 against an abutment or shoulder 66 thereof. Both race rings preferably have press-fits. The bearing housing 64 has an external abutment or shoulder 68 and a slightly tapered periphery engaging a pad or yielding cushion 70 which fits in an opening of the motor casing. The cushion is held under some compression by an annular abutment or projection 72 on a clamping plate 74 which is fastened by screws 76 in a recess of the motor casing. If desired, the amount of compression may be varied, as by inserting a washer 75 of selected thickness between the abutment 72 and the cushion, or by inserting a washer 77 under the plate 74, the washers desirably being of different thicknesses for finer adjustment. A gasket 78 engaging the plate 74 and the end of the motor casing is clamped by a cover plate 80 having an internally threaded flange 82 screwed on the motor casing. The cover plate 80 has an extension 84 with an opening for the spindle and this opening is covered by a skirt or deflector 86 to exclude acid or other foreign matter.

The exterior of the bearing housing 64 has a clearance at its ends with the clamping plate 74 and with the casing, and such clearance is desirably a little less than that between the armature 28 and the laminations 18. The exterior of the lower bearing housing 40 also has less clearance with the surrounding parts than that between armature 28 and laminations 18. This will guard against any possible contact of the armature and laminations. The upper bearing and the upper cushion are shown larger than the lower bearing and its cushion but this is not essential. Compression of the upper cushion will effect a compression of the lower one and the slight resultant endwise shifting of the outer race rings will produce some preloading of the bearings along opposed angular contact lines but the cushions are preferably of comparatively soft rubber so that a possible expansion of the spindle will produce no excessive load. The bearings are of a type capable of resisting both radial and thrust loads. The cushions damp the radial shock loads acting between the spindle and the casing and so protect the bearings. The cushions also apply an initial thrust load to the bearings and this is advantageous in preventing radial looseness.

Any vertical spindle rotating at certain high speeds tends to find its own gyroscopic center like a top but, at other speeds, there is a tendency, due to lack of balance, for a slender spindle journalled on spaced bearings to bow or bend and transmit shock and vibration to the bearings and their supporting casing. Lack of balance in the present spindle itself will be very small but the lack of balance may be aggravated by the bucket or other variable load carried at its upper or unsupported end. Shock loads and vibrations are absorbed by the cushions, thus protecting the bearings, and the comparatively soft cushioning material will also allow some lateral shifting of the bearing housings thereby aiding the spindle in finding its own proper axis of rotation. The cushions, being under axial as well as radial compression, also apply the advantageous initial thrust load which, in the present embodiment, is effected by a tendency to urge the outer race rings of the bearing axially towards one another while the inner race rings remain fixed on the spindle.

In Fig. 2 is indicated a modification wherein the flanged bearing housings or sleeves are omitted and the abutments for the cushions are supplied by a ring 68a or 44a fixed to the outer race ring. Such ring 68a or 44a is conveniently a split ring with a rib 90 entering a holding groove in the race ring so that the ring becomes in effect an integral flange on the bearing.

I claim:

1. In a device of the character indicated, a spindle, a casing, a pair of thrust and radial load bearings between the spindle and the casing, a pair of cushions between the spindle and the casing, each bearing and one of the cushions being arranged one outside of the other to relieve the bearings of radial shock loads acting between the spindle and the casing, each bearing having one of its race rings held from axial movement with respect to the corresponding race ring of the other bearing, the remaining race rings being relatively shiftable, and means for compressing the cushions to urge said remaining race rings to have relative axial shifting and thereby apply thrust loads to the bearings; substantially as described.

2. In a device of the character indicated, a spindle, a casing, a pair of thrust and radial load bearings on the spindle, a cushion between each bearing and the casing to damp radial shock loads, and means for compressing the cushion to apply initial thrust loads to the bearings; substantially as described.

3. In a device of the character indicated, a spindle, a casing, a pair of thrust and radial load bearings having their inner race rings fixed on the spindle, a cushion between the outer race ring of each bearing and the casing to damp radial shock loads, and means acting through the cushion to effect a relative axial movement between the outer race rings to apply thrust loads to the bearings; substantially as described.

4. In a device of the character indicated, a spindle having a pair of abutments, a casing having a pair of abutments, a pair of thrust and radial load bearings between the spindle and the casing, a pair of cushions between the spindle and the casing, each bearing and one of the cushions being arranged one outside of the other to relieve the bearings of radial shock loads acting between the spindle and the casing, the outside member of each associated bearing and cushion engaging at one end with one of the casing abutments and the inside member engaging at one end with one of the spindle abutments, the casing abutment and the spindle abutment facing in opposite directions, and an abutment carried by each bearing and engaging one of the cushions in axial opposition to one of the other abutments; substantially as described.

5. In a device of the character indicated, a spindle having a pair of abutments, a casing having a pair of abutments, a pair of thrust and radial load bearings between the spindle and the casing, a pair of cushions between the spindle and the casing, each bearing and one of the cushions being arranged one outside of the other to relieve the bearings of radial shock loads acting between the spindle and the casing, the outside member of each associated bearing and cushion engaging at one end with one of the casing abutments and the inside member engaging at one end with one of the spindle abutments, the casing abutment and the spindle abutment facing in opposite directions, a sleeve interposed between each bearing and cushion and having abutments engaging each of said associated members whereby compression of the cushions will apply an initial thrust load to the bearings; substantially as described.

6. In a device of the character indicated, a spindle having a pair of abutments, a casing having a pair of abutments, a pair of thrust and radial load bearings, each engaging one of the spindle abutments, cushions between each bearing and the casing to relieve the bearings of radial shock loads, each cushion engaging one of the casing abutments, and an abutment carried by each bearing and engaging one of the cushions in opposition to one of the casing abutments, and the bearing-carried abutments being capable of relative axial movement whereby compression of the cushions will apply a thrust load to the bearings; substantially as described.

7. In a device of the character indicated, a spindle having a pair of abutments, a casing having a pair of abutments, a pair of thrust and radial load bearings between the spindle and the casing, a pair of separated sleeves between the spindle and the casing, cushions between the spindle and the casing to damp radial shock loads therebetween, each sleeve having a bearing-engaging abutment facing in one direction and a cushion-engaging abutment facing in an opposite direction, and each sleeve having one of its abutments opposing one of the spindle abutments and having its other abutment opposing one of the casing abutments; substantially as described.

8. In a device of the character indicated, a spindle, a casing, thrust and radial load bearings on the spindle, a pair of separated bearing housings each containing one of the bearings, cushions interposed between the bearing housings and the casing to damp radial shock load, each bearing housing having an inwardly projecting bearing-engaging abutment at one end and an outwardly projecting cushion-engaging abutment at the other end, the casing having abutments engaging the cushions in axial opposition to the abutments on the bearing housings, and the bearing engaging abutments on the bearing housings facing in opposite directions; substantially as described.

9. In a device of the character indicated, a spindle, a casing, an antifriction bearing between the spindle and the casing, a cushion between the spindle and the casing, the bearing and the cushion being arranged one outside of the other to relieve the bearings of shock load, the bearing having a groove in one of its race rings, a ring projecting from the groove and engaging one end of the cushion, and means acting in opposition to said ring to effect adjustment of the compression of the cushion; substantially as described.

10. In a device of the character described, a spindle, a casing, a pair of spaced-apart antifriction bearings between the spindle and the casing, bearing housings between the bearings and the casing, cushions interposed directly between and engaging the bearing housings and the casing, the bearing housings having small circumferential clearance with the casing, the clearance being less than that between any casing-carried parts and any parts which rotate with the spindle so that the bearing housings and the casing can engage one another to prevent engagement of any relatively rotatable parts; substantially as described.

11. In a device of the character described, a spindle, a casing, a pair of spaced-apart antifriction bearings between the spindle and the casing, a sleeve surrounding at least one of the bearings and having an abutment, the casing having an opposing abutment, a cushion between the casing and the sleeve and interposed between the abutments, and means for forcing one of the race rings of the remaining bearing axially with respect to the spindle to compress said cushion and preload the bearings; substantially as described.

RAYMOND L. BROWN.